Figure 1:
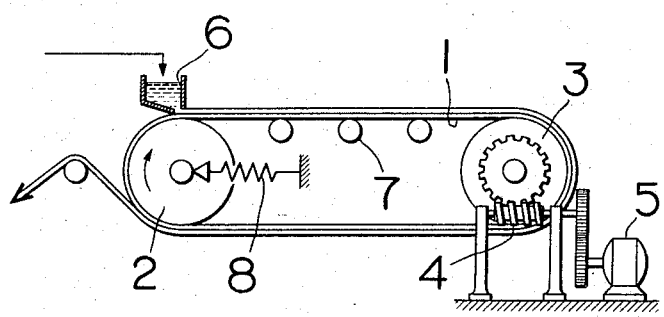

Masao Tsuda
Mitsuo Okajima
INVENTORS

BY Stevens, Davis, Miller & Mosher
ATTORNEYS

3,360,825
FILM MAKING APPARATUS

Masao Tsuda and Mitsuo Okajima, Kanagawa-ken, Japan, assignors to Fuji Shashin Film Kabushiki Kaisha, Kanagawa-ken, Japan, a corporation of Japan
Filed Aug. 3, 1964, Ser. No. 386,984
Claims priority, application Japan, Aug. 6, 1963, 38/40,498
2 Claims. (Cl. 18—15)

This invention relates to an improved apparatus for making polymer films and, more particularly, to an improved band-machine type film-making apparatus.

Hitherto, a band-machine type apparatus consisting of two main drums and an endless metal belt has been used as one of means for making a polymer film. In such a conventional band-machine type apparatus, the feed polymer is applied or spread on the surface of the progressing endless belt at just above one of the drums, and driving of the endless belt is conducted by driving the polymer-applying side drum or casting drum while the lateral movement control of the endless belt has been conducted by another drum.

There is a defect, however, in such a conventional system. That is, as the endless metal belt is driven by the casting drum, the vibrations occurred in the driving source are transmitted to the metal band, which makes the smooth travel of the endless belt difficult. Further, as a polymer spreading means is mounted on supporting frame fixed to the casting drum, the spreading means is also vibrated by the vibrations in the driving source, which results in causing unevenness in thickness of a film formed on the belt even visibly in an extreme case. Such unevenness gives a fatal defect to a photographic film as well as other films which are used for similar purposes. Moreover, a conventional apparatus for conducting such a process has been operated at a low speed and the tendency to unevenness in thickness has been enhanced increasingly with increase of the operation speed.

Therefore, an object of this invention is to provide a means for making uniform polymer films by a band-machine type film-making apparatus.

Other object of this invention is to provide an improved driving system for a band-machine type apparatus.

Still another object of this invention is to provide uniform polymer films having no unevenness in thickness.

In accordance wtih this invention, the system is so arranged that the endless metal belt is driven by a drum other than the casting drum, that is, the metal belt is not driven by a drum of the side where a feed polymer is spread. (The drum that drives the endless belt in this invention is hereinafter called "an opposite drum.") Any powers, reduction gears, speed change gears, etc., may be used in this invention to drive the opposite drum of the band-machine system.

Furthermore, the invention includes a case wherein more than 2 drums are used for supporting an endless metal belt and in such a case any one or more drums except the drum most adjacent a feed polymer spreading means, or the casting drum may be driven for moving the endless belt.

Figure 2:
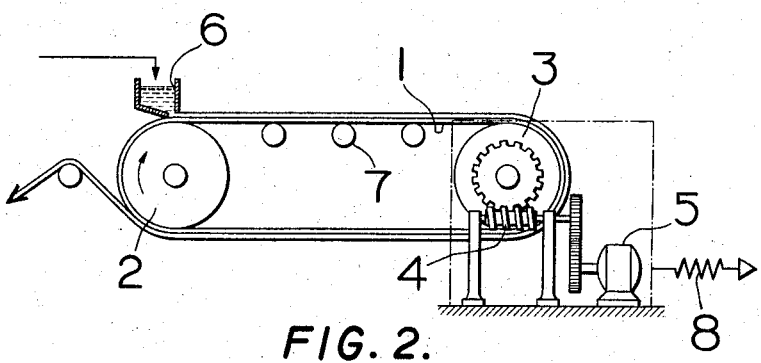

The apparatus of this invention is further explained in detail referring to the attached drawing, wherein:

FIG. 1 is a side view showing an embodiment of the apparatus of this invention; and FIG. 2 is a side view showing another embodiment of this invention.

In the figures, an endless metal belt 1 is supported between a spaced casting drum 2 and an opposite or driven drum 3 and the opposite drum 3 is rotated by means of a suitable motor 5 through a reduction worm gear 4 directly connected to the motor. A polymer film is formed by spreading a fluid polymer on the travelling metal belt 1 from a fluid-polymer spreading means 6. The spread polymer is dried on the metal belt to form a polymer film and is stripped off from the metal belt before the belt returns to the original position. In general, the metal belt does not travel stably and moves laterally. In order to correct the shift of the metal belt, a reshifting means 8 is equipped to a drum, whereby the drum is adjusted to keep the metal belt to a normal position. In addition, auxiliary rollers 7 are also arranged for supporting the endless metal belt.

An embodiment of this invention shown in FIG. 1 shows a system wherein the lateral-movement control of the metal belt is connected to the casting drum, that is, the re-shifting means 8 is connected to the casting drum 2 but the system may be one as shown in FIG. 2 wherein the lateral-movement control of the metal band is conducted by adjusting the casting drum, that is, by moving the casting drum and the driving mechanism together.

As mentioned above, when the endless belt is driven by rotating the opposite drum instead of rotating the casting drum according to this invetnion, unevenness in thickness of thus produced films is extremely reduced or there is no unevenness in thickess in the films. This is because even if the driving source, or opposite drum is vibrated, the vibrations are damped in the metal belt positioned between the opposite drum and the casting drum, which results in completely protecting the casting drum from vibrations.

What is claimed is:

1. An apparatus for making films for photographic materials comprising at least two spaced drums including an undriven casting drum and a driven drum, an endless metal belt supported between said drums, driving means connected to said driven drum to drive said endless belt, polymer spreading means disposed essentially in vertical alignment with the axis of said casting drum to distribute a liquid polymer onto said endless metal belt, a plurality of rollers positioned between said drums to support the upper pass of said endless metal belt, and reshifting means operatively connected to one of said drums to adjust the position of said one drum to compensate for lateral shifting of said endless metal belt during operation.

2. Apparatus according to claim 1, wherein said reshifting means are connected to said casting drum.

References Cited

UNITED STATES PATENTS

| | | | |
|---|---|---|---|
| 1,090,679 | 3/1914 | Borzykowski | 18—15 |
| 2,017,094 | 10/1935 | Hetzel. | |
| 2,346,765 | 4/1944 | Kratz | 18—15 |
| 2,441,235 | 11/1948 | Blair et al. | 18—15 X |
| 1,116,762 | 11/1914 | Thornton et al. | 18—15 |
| 1,310,311 | 7/1919 | Travis | 18—15 |
| 1,157,149 | 10/1915 | Conger | 18—15 |
| 2,134,172 | 10/1938 | Calvert | 18—15 |

WILLIAM J. STEPHENSON, *Primary Examiner.*